(12) United States Patent
Hu et al.

(10) Patent No.: US 11,842,163 B2
(45) Date of Patent: Dec. 12, 2023

(54) METHOD AND APPARATUS FOR GENERATING PREDICTION INFORMATION, AND ELECTRONIC DEVICE AND MEDIUM

(71) Applicant: BEIJING BYTEDANCE NETWORK TECHNOLOGY CO., LTD., Beijing (CN)

(72) Inventors: Xiaowei Hu, Beijing (CN); Cheng Yang, Beijing (CN); Changhu Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/078,747

(22) Filed: Dec. 9, 2022

(65) Prior Publication Data
US 2023/0106202 A1  Apr. 6, 2023

Related U.S. Application Data

(63) Continuation of application No. PCT/CN2021/111734, filed on Aug. 10, 2021.

(30) Foreign Application Priority Data

Aug. 10, 2020 (CN) .......................... 202010797886.2

(51) Int. Cl.
*G06F 40/30* (2020.01)
*G06V 30/148* (2022.01)

(52) U.S. Cl.
CPC ............ *G06F 40/30* (2020.01); *G06V 30/148* (2022.01)

(58) Field of Classification Search
CPC .............................. G06F 40/30; G06V 30/148
See application file for complete search history.

(56) References Cited

U.S. PATENT DOCUMENTS

| 10,565,234 | B1 * | 2/2020 | Sims ...................... G06F 16/93 |
| 10,956,520 | B1 * | 3/2021 | Beaman ................ G06N 20/00 |

(Continued)

FOREIGN PATENT DOCUMENTS

| CN | 106777013 A | 5/2017 |
| CN | 107066449 A | 8/2017 |

(Continued)

OTHER PUBLICATIONS

International Patent Application No. PCT/CN2021/111734; Int'l Search Report; dated Nov. 3, 2021; 2 pages.

(Continued)

*Primary Examiner* — Kevin Ky
(74) *Attorney, Agent, or Firm* — BakerHostetler

(57) ABSTRACT

Disclosed are a method and apparatus for generating prediction information, and an electronic device and a medium. One embodiment of the method comprises: acquiring at least one input word; generating a word vector of each input word of the at least one input word to obtain a word vector set, wherein the at least one input word is obtained by performing word segmentation on target input text; generating an input text vector on the basis of the word vector set; and on the basis of the input text vector and a user vector, generating prediction information for predicting a user intention, wherein the user vector is obtained on the basis of user historical record information. In this embodiment, prediction information for predicting a user intention is generated, such that the popping up of unnecessary information is reduced. A user can be prevented from being disturbed, thereby improving the user experience.

17 Claims, 7 Drawing Sheets

(56) References Cited

U.S. PATENT DOCUMENTS

| | | | |
|---|---|---|---|
| 11,361,084 B1* | 6/2022 | So | G06F 21/6245 |
| 2018/0285928 A1 | 10/2018 | Kirmani et al. | |
| 2020/0382612 A1* | 12/2020 | Zhao | G06N 3/08 |
| 2020/0401765 A1* | 12/2020 | Ran | G06F 40/30 |
| 2021/0019479 A1* | 1/2021 | Tu | G06F 40/58 |
| 2021/0256966 A1* | 8/2021 | Chatterjee | G06N 3/04 |
| 2022/0130378 A1* | 4/2022 | Avijeet | G10L 13/027 |
| 2022/0317641 A1* | 10/2022 | Wang | H04L 12/282 |
| 2023/0106202 A1* | 4/2023 | Hu | G06F 40/216 |
| | | | 704/9 |

FOREIGN PATENT DOCUMENTS

| | | |
|---|---|---|
| CN | 108733651 A | 11/2018 |
| CN | 109634438 A | 4/2019 |
| CN | 110162191 A | 8/2019 |
| CN | 110502614 A | 11/2019 |
| CN | 110555207 A | 12/2019 |
| CN | 110941710 A | 3/2020 |
| CN | 111931494 A | 11/2020 |
| WO | WO 2019/149200 A1 | 8/2019 |

OTHER PUBLICATIONS

European Patent Application No. 21855514.2; Extended Search Report; dated Oct. 16, 2023; 7 pages.

* cited by examiner

METHOD AND APPARATUS FOR GENERATING PREDICTION INFORMATION, AND ELECTRONIC DEVICE AND MEDIUM

CROSS-REFERENCE

This application is a continuation of PCT application Ser. No. PCT/CN2021/111734, titled "METHOD AND APPARATUS FOR GENERATING PREDICTION INFORMATION, AND ELECTRONIC DEVICE AND MEDIUM", filed on Aug. 10, 2021, which claims priority to Chinese patent application No. 202010797886.2 with a filing date of Aug. 10, 2020 and a title of "METHOD AND APPARATUS FOR GENERATING PREDICTION INFORMATION, AND ELECTRONIC DEVICE AND MEDIUM", the entire contents of both of which are incorporated herein by reference.

FIELD

Embodiments of the present disclosure relate to the technical field of computers, in particular to a method and apparatus for generating prediction information, an electronic device and a medium.

BACKGROUND

With the development of the Internet era, people often use electronic devices to input information for communication, and the input information is generally text information. In order to make expression of the input information richer and more intuitive, a graphics interchange format (GIF) image related to the text information is also often used. In order to improve user experience, a mode of automatically popping the GIF image may be adopted. For example, when a user uses private messages to talk, the GIF image can be automatically popped after inputting the text information. However, too frequently popping the GIF image will also disturb the user and affect the user experience.

SUMMARY

The content section of this disclosure is used to present ideas in a brief form that will be described in detail in the specific embodiments section that follows. The content portion of this disclosure is not intended to identify key features or essential features of the claimed technical solution, nor is it intended to limit the scope of the claimed protected technical solution.

Some embodiments of the present disclosure propose method and apparatuses for generating prediction information, and electronic device and medium to address the technical issues mentioned in the background technology section above.

In a first aspect, some embodiments of the present disclosure provide a method for generating prediction information, comprising: obtaining at least one input word, wherein the at least one input word is obtained by segmenting a target input text; generating a word vector of each input word among the at least one input word to obtain a word vector set; generating an input text vector based on the word vector set; and generating prediction information used for predicting a user intention based on the input text vector and a user vector, wherein the user vector is obtained based on user history information.

In a second aspect, some embodiments of the present disclosure provide an apparatus for generating prediction information, comprising: an obtaining unit, configured to obtain at least one input word, wherein the at least one input word is obtained by segmenting a target input text; a word vector generating unit, configured to generate a word vector of each input word among the at least one input word to obtain a word vector set; an input text vector generating unit, configured to generate an input text vector based on the word vector set; and a generating unit, configured to generate prediction information used for predicting a user intention based on the input text vector and a user vector.

In a third aspect, some embodiments of the present disclosure provide an electronic device, comprising: one or more processors; and a storage apparatus, storing one or more programs, wherein the one or more programs, when executed by the one or more processors, cause the one or more processors to implement the method as described in the first aspect.

In a fourth aspect, some embodiments of the present disclosure provide a non-transitory computer-readable medium, storing a computer program, wherein the program, when executed by a processor, implements the method as described in the first aspect.

One of the above embodiments of the present disclosure has the following beneficial effects: an input text vector is generated by generating a word vector of an input word. The situation that directly generating the input text vector is prone to causing an error can be avoided. Then, prediction information used for predicting a demand intention of a user is generated based on the input text vector and a user vector. Because the user vector is obtained based on user history information, the user vector may reflect historical behavior of the user. Thus, the generated prediction information is more consistent with demands of the user. Therefore, a method for judging the demand intention of the user according to the user vector and the input text vector is provided. The demand intention of the user is predicted before popping a GIF image to the user, so that popping of unnecessary information is reduced, the user is prevented from being disturbed, and user experience is improved.

BRIEF DESCRIPTION OF THE DRAWINGS

These and other features, advantages and aspects of embodiments of the present disclosure will become more apparent in conjunction with the accompanying drawings and with reference to the following specific embodiments. Throughout the accompanying drawings, identical or similar appended markings indicate identical or similar elements. It should be understood that the accompanying drawings are schematic and that the originals and elements are not necessarily drawn to scale.

DETAILED DESCRIPTION OF THE EMBODIMENTS

Embodiments of the present disclosure will be described in greater detail below with reference to the accompanying drawings. While certain embodiments of the present disclosure are shown in the accompanying drawings, it should be understood, however, that the present disclosure may be implemented in various forms and should not be construed as limited to the embodiments set forth herein. Rather, these embodiments are provided for a more thorough and complete understanding of the present disclosure. It should be understood that the accompanying drawings and embodiments of the present disclosure are for exemplary purposes only and are not intended to limit the scope of protection of the present disclosure.

It is also noted that, for ease of description, only those portions of the accompanying drawings are shown that relate to the invention in question. The embodiments and the features in the embodiments of the present disclosure may be combined with each other without conflict.

It should be noted that the concepts of "first" and "second" mentioned in this disclosure are used only to distinguish between different devices, modules or units, and are not intended to define the order or interdependence of the functions performed by these devices, modules or units.

It should be noted that the modifications of "one" and "more than one" referred to in this disclosure are illustrative rather than limiting, and it should be understood by those skilled in the art to mean "one or more" unless the context clearly indicates otherwise.

The names of the messages or information interacted between the plurality of devices in this implementation of the disclosure are used for illustrative purposes only and are not intended to limit the scope of those messages or information.

The present disclosure will be described in detail below with reference to the accompanying drawings and in conjunction with embodiments.

Figure 1:
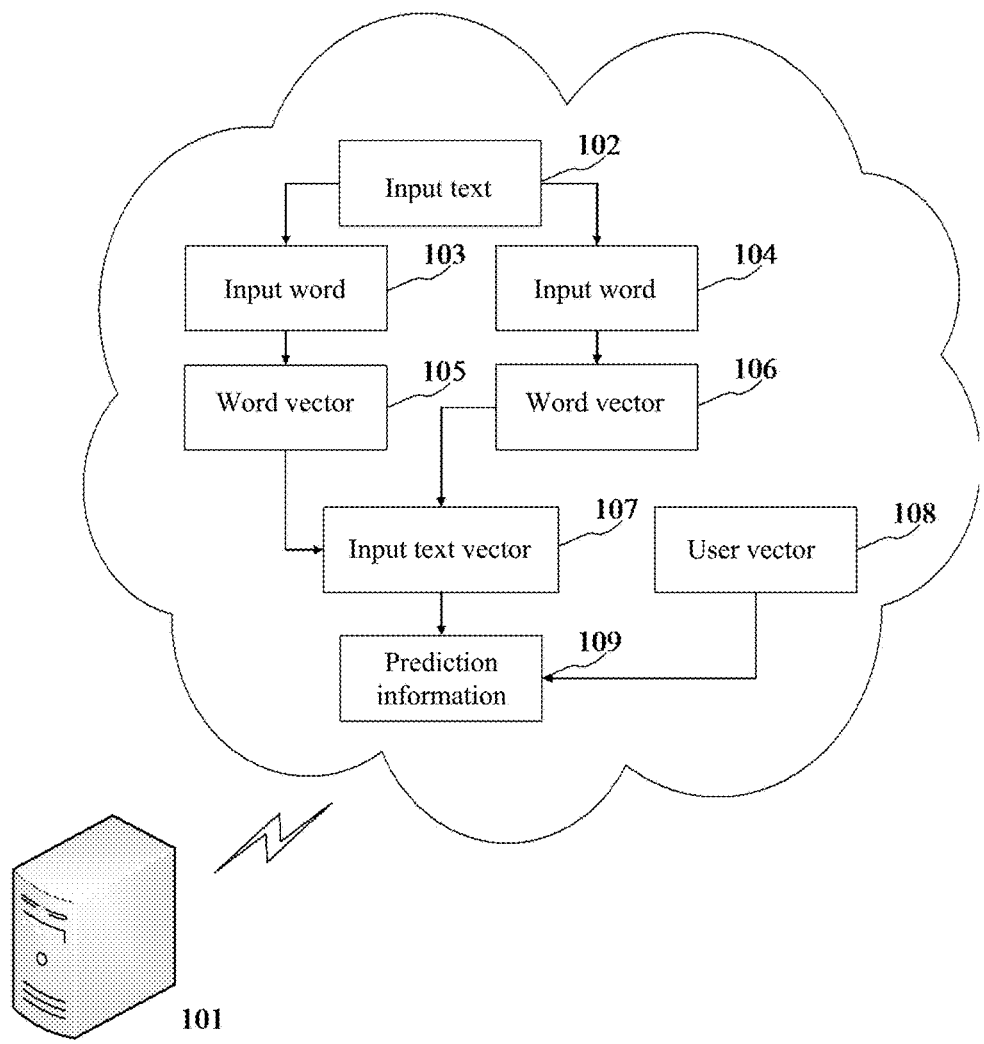
FIG. 1 is a schematic diagram of an application scene of a method for generating prediction information according to some embodiments of the present disclosure.

FIG. 1 is a schematic diagram of an application scene of a method for generating prediction information according to some embodiments of the present disclosure.

As shown in FIG. 1, a computing device 101 may obtain an input word 103 and an input word 104. The obtained input word 103 and input word 104 may be obtained by segmenting an input text 102. Of course, the input text 102 may also be segmented by other computing devices, and then the computing device directly gets a segmentation result, namely the input word 103 and the input word 104. Then, the computing device 101 may generate a word vector 105 of the input word 103 and a word vector 106 of the input word 104. An input text vector 107 may be generated based on the generated word vector 105 and word vector 106. The computing device 101 may generate prediction information 110 based on the generated input text vector 107 and a user vector 108.

It should be noted that the above computing device 101 may be hardware or software. When the computing device is the hardware, it may be implemented as a distributed cluster composed of a plurality of servers or terminal devices, and may also be implemented as a single server or a single terminal device. When the computing device is the software, it may be implemented as, for example, a plurality of software or software modules configured to provide distributed services, and it may also be implemented as single software or a single software module. No specific limitation is made here.

It should be understood that the number of the computing device in FIG. 1 is only schematic. According to implementation needs, there may be any number of computing devices.

Figure 2:
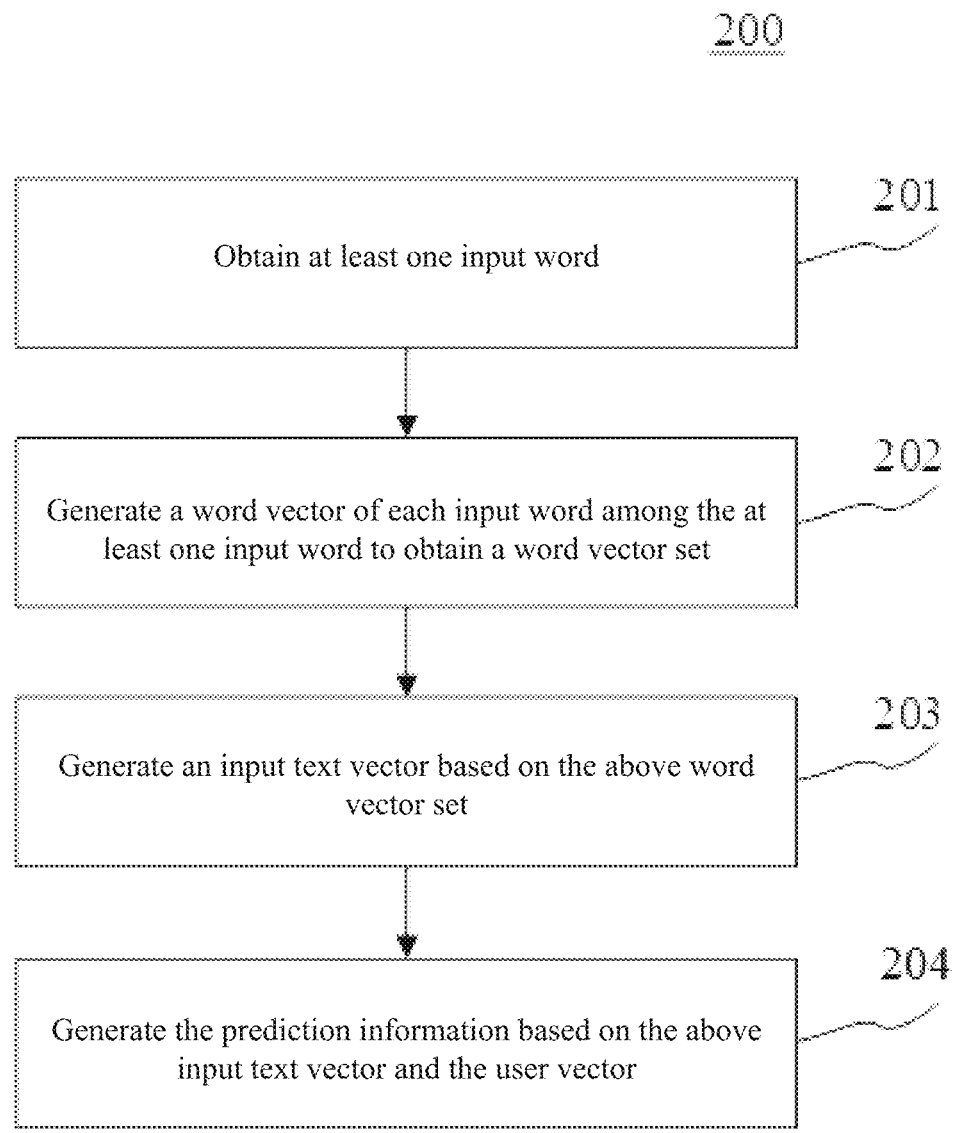
FIG. 2 is a flow chart of some embodiments of a method for generating prediction information according to the present disclosure.

Continue to refer to FIG. 2, which shows a flow chart 200 of some embodiments of a method for generating prediction information according to the present disclosure. The method for generating the prediction information includes the following steps:

step 201, at least one input word is obtained.

In some embodiments, an executive body (the computing device 101 as shown in FIG. 1) of the method for generating the prediction information may obtain the above at least one input word through a wired connection or wireless connection mode. The above at least one input word is a word obtained by segmenting a target input text. For example, the above executive body may receive input text input by the user as the target input text. Then, the at least one input word is obtained by segmenting the received target input text. For another example, the above executive body may receive the input word input by the user as the above at least one input word.

It should be noted that the above wireless connection mode may include, but not limited to 3G/4G connection, WiFi connection, Bluetooth connection, WiMAX connection, Zigbee connection, ultra wideband (UWB) connection and other wireless connection modes that are known now or developed in the future.

Step 202, a word vector of each input word among the at least one input word is generated to obtain a word vector set.

In some embodiments, the above executive body may generate the word vector of the input word in a variety of ways. For example, the above executive body may perform word embedding on each input word among the above at least one input word to obtain the word vector of each input word, and obtain the above word vector set through combination. For another example, the above executive body may obtain the word vector of the above input word by searching a predefined word vector table. Here, the word vector table may be used for representing a corresponding relation between the input word and the word vector.

The word embedding described above is the general name of language model and representation learning technology in natural language processing (NLP). Conceptually, it refers to that a high-dimensional space whose dimension is the number of all words is embedded into a continuous vector space with a much lower dimension, and each word or phrase is mapped to a vector on a real number field. Specifically, the word vector may be a vector where the word or phrase is mapped to a real number through the word embedding method. Conceptually, it involves mathematical embedding from a one-dimensional space of each word to the continuous vector space with the lower dimension.

Step 203, an input text vector is generated based on the above word vector set.

In some embodiments, the above executive body may generate the above input text vector in a summing mode. As an example, the above executive body may use an accumulation method to add the word vectors in the above word vector set together to generate the above input text vector. As an example, the above executive body may use an average method to add the word vectors in the word vector set together and then calculate an average value to generate the above input text vector.

Step 204, prediction information used for predicting a user intention is generated based on the above input text vector and the user vector.

In some embodiments, the above executive body may perform point multiplication on the input text vector with the above user vector to obtain a point multiplication result. The above executive body may obtain the user vector by searching a predefined corresponding relation table between user account information and the user vector according to the user account information. Here, the user vector may be a vector used for representing user historical operations. As an example, the user vector may be a vector used for representing a historical record whether the user clicks a popped GIF image. The point multiplication result may be processed by using an activation function to obtain a point multiplication score. Here, the activation function may be a Sigmoid function, which may be used for mapping data to an interval of (0,1). Scores may be expressed in many forms, such as probability. Here, the point multiplication of the vector may also be called inner product or scalar product of the vector. Point multiplication may be to multiply corresponding bits of two vectors one by one and then sum, and the point multiplication result is a scalar.

In some optional implementations of some embodiments, the user vector is obtained based on user history information. The user history information may be historical operation record information whether the user clicks a popped image.

Optionally, the above executive body may also use a normalization method to process the point multiplication result to obtain the point multiplication score. The normalization method may be used for converting data into decimals between (0,1).

In some embodiments, the above executive body may compare the obtained point multiplication score with a preset threshold to obtain a comparison result. Then the prediction information used for predicting the user intention is generated according to the above comparison result. The prediction information may be text expression of the above comparison result. Here, the preset threshold may be a preset score value used for determining whether the above point multiplication score meets the demand.

As an example, the obtained point multiplication score may be "0.8 points", and the preset threshold may be "0.6 points". The above executive body may compare the above point multiplication score with the above preset threshold to obtain the comparison result that "the above point multiplication score is greater than the above preset threshold". Then, the above executive body may generate the prediction information that "it may be needed to pop a GIF image for the user".

Figure 3A:
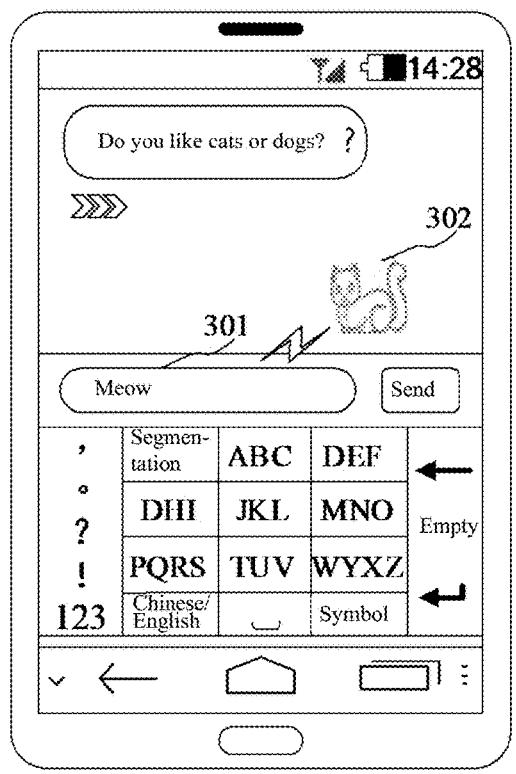
FIGS. 3A and 3B are schematic diagrams of an application scene of a method for generating prediction information according to some embodiments of the present disclosure.
Figure 3B:
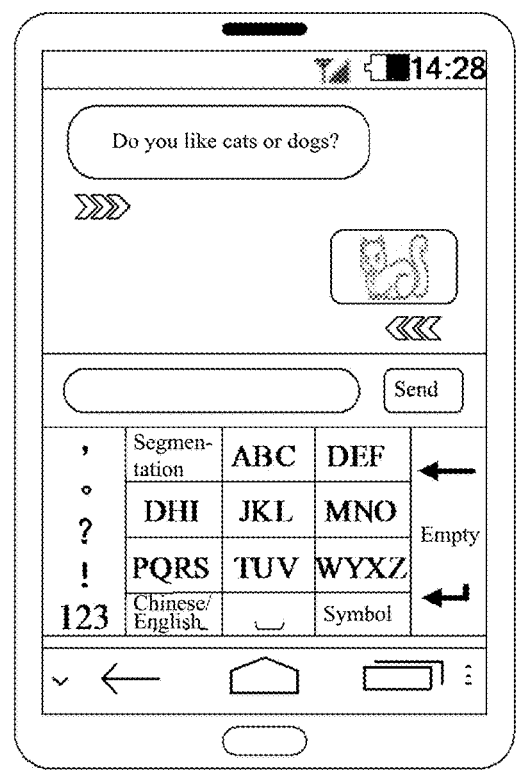
Figure 4A:
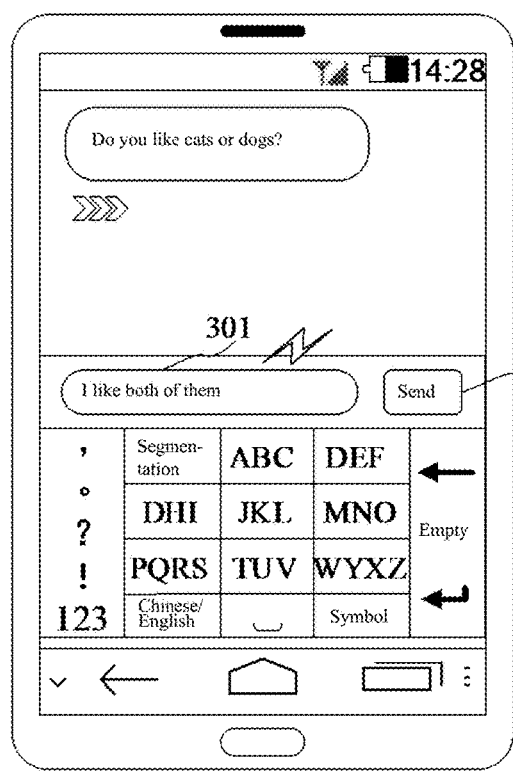
FIGS. 4A and 4B is a schematic diagram of an application scene of a method for generating prediction information according to some embodiments of the present disclosure.
Figure 4B:
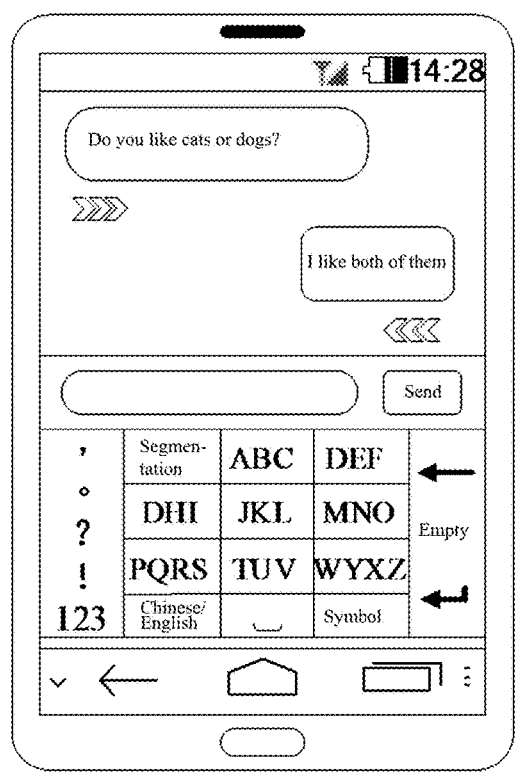

As an example, in the application scene shown in FIGS. 3A and 3B, when the user inputs information of "meow" in an input box 301 after receiving a message, the obtained point multiplication score may be "0.9 points", and the preset threshold may be "0.6 points". Then, the above executive body may generate the prediction information that "it may be needed to pop a GIF image for the user" according to the comparison result. Thus, the above executive body displays an image 302. Optionally, when the user clicks the image 302, the above executive body may send the image 302 as sending information. In the application scene shown in FIGS. 4A and 4B, when the user inputs information of "I like both of them" in the input box 301 after receiving the message, the obtained point multiplication score may be "0.3 points". Then, the above executive body may generate the prediction information that "it may not be needed to pop a GIF image for the user" according to the comparison result. Thus, the above executive body does not display the image. Optionally, when the user clicks a sending button 303, the above executive body may send the information input by the user in the input box 301.

In some optional implementations of some embodiments, the above method further includes: whether to pop an image is determined according to the above prediction information used for predicting the user intention; in response to determining to pop the image, at least one image is selected from an image database as the popped image to obtain a popped image set; the popped images in the above popped image set are sorted based on the above user historical operation record information to obtain a popped image sequence; a preset number of popped images are selected from the above popped image sequence; and the above preset number of popped images are displayed on a target interface.

In some optional implementations of some embodiments, in response to determining to pop the image, selecting the at least one image from the image database as the popped image to obtain the popped image set includes: in response to determining to pop the image, a feature vector of each image in the image database is obtained to obtain a feature vector set; a relevancy between each feature vector in the feature vector set and the input text vector is determined to obtain a relevancy set; and an image with the relevancy greater than a preset threshold is selected from the image database as the popped image based on the relevancy set to obtain the popped image set.

As an example, the prediction information used for predicting the user intention may be "it may be needed to pop a GIF image for the user". Then, the above executive body may determine to pop the image (such as, the GIF image). Then, the above executive body may obtain the feature vector of each image in the image database. Here, the image database includes at least one image and feature vectors corresponding to the images. The above relevancy may be a score value used for representing that there is interrelation between the feature vector and the input text vector. The above executive body may calculate the relevancy between each feature vector and the input text vector through an algorithm, and may also use a pre-trained relevancy model to obtain the relevancy between each feature vector and the input text vector. Then, the above executive body may select the image with the relevancy greater than the preset threshold from the image database as the popped image to obtain the popped image set. The above user historical operation record information may include whether the user clicks a popped image, and may also include a click number of the user clicking the popped image. Therefore, the above executive body may sort the popped image set based on the click number from large to small to obtain the popped image sequence. Finally, the above executive body may select the preset number of popped images from the popped image sequence and then display them on the target interface.

In some optional implementations of some embodiments, the above executive body may input the above input text vector and the above user vector into a pre-trained prediction information generating model to obtain the prediction information. The above executive body may generate the above prediction information generating model through the following steps: step 1, a training sample set is obtained, wherein a training sample includes a sample input text vector, a sample user vector and sample prediction information; step 2, the training sample is selected from the above training sample set; step 3, the sample input text vector and the sample user vector in the training sample of the training sample set are input into an initial model; step 4, the output prediction information is compared with the above sample prediction information to obtain an information loss value; step 5, the above information loss value is compared with a preset threshold to obtain a comparison result; step 6, whether training of the above initial model is completed is determined according to the comparison result; and step 7, in response to that training of the above initial model is completed, the above initial model is determined as the prediction information generating model.

In some optional implementations of some embodiments, in a training process of the prediction information generating model, a gradient descent optimization method is adopted to reduce the information loss value.

In some optional implementations of some embodiments, the above executive body may obtain the user vector through the following steps: 1, the above executive body may obtain user account information; 2, the above executive body may search for the user historical operation record information from a database according to the user account information, wherein the above database includes the user account information and the historical operation record information corresponding to the account information; 3, the above executive body may perform word embedding on the user historical operation record information to obtain a historical operation record information vector; and 4, the above executive body may determine the obtained historical operation record information vector as the user vector of the user.

In some optional implementations of some embodiments, the above sample prediction information may be sample information used for representing that whether the user clicks the popped image. As an example, the sample prediction information may be "0", and may also be "1". When the sample prediction information is "0", it may represent that "the user does not click the popped image", and when the sample prediction information is "1", it may represent that "the user clicks the popped image".

The information loss value stated above may be a value obtained by inputting the above output prediction information and the corresponding sample prediction information as parameters into an executed loss function. Here, the loss function (such as a square loss function and an exponential loss function) is usually used for estimating the degree of inconsistency between a predicted value (such as the above sample feature corresponding to the sample sampling frame) of the model and a true value (such as the sample feature corresponding to each sampling frame among a plurality of sample sampling frames obtained through the above steps). It is a non-negative real valued function. In general, the smaller the loss function, the better the robustness of the model. The loss function may be set according to actual demand. As an example, the loss function may be a cross entropy loss function.

Here, the above initial model may be an untrained model or a model that does not meet a preset condition after training. The above initial model may also be a model with a deep neural network structure. A pre-trained feature extraction model may be a pre-trained neural network model for feature extraction. The neural network model may have various existing neural network structures. For example, the neural network structure may be a convolutional neural network (CNN). A storage location of the initial model is also not limited in the present disclosure.

In some optional implementations of some embodiments, the above method further includes: in response to determining that training of the initial model is not completed, relevant parameters in the initial model are adjusted, a sample is reselected from the above training sample set, and the adjusted initial model is taken as the initial model to continue to perform the above training steps.

In some optional implementations of some embodiments, the above training sample set is updated through the following steps: a user related information set is obtained, wherein user related information in the above user related information set includes the input text vector, the user vector and the prediction information, and above prediction information is not predicted by the above prediction information generating model; data amplification is performed on the user related information set based on a preset proportion to obtain an amplified user related information set; and the amplified user related information set is added to the above training sample set to generate an updated training sample set.

As an example, performing data amplification on the above user related information set may be that the user related information in the above user related information set is repeatedly sampled based on the preset proportion to obtain the amplified user related information set.

In some optional implementations of some embodiments, in an actual operation process of the prediction information generating model, if the user related information in the user related information set is used for judging the user intention through the prediction information generating model, then the user related information obtained in an accumulation process of new data may be doped with results of model interference. As a result, the generated prediction information is inaccurate, which affects user experience. Therefore, in the actual operation process, the user related information with the preset proportion (for example, 90%) is used for judging the user intention through the prediction information generating model. The remaining (for example, the remaining 10%) user related information is expanded to the full amount of data by means of repeated sampling. Then these data is used for training the prediction information generating model for the next time. Because the data used in this training is not doped with the results of model interference, it is conducive to improving the accuracy of the prediction information generating model. This method is called data depolarization.

Optionally, the above executive body may update the training sample set of the prediction information generating model according to a preset period.

One of the above embodiments of the present disclosure has the following beneficial effects: the input text vector is generated by generating the word vector of the input word. The situation that the directly generating the input text vector is prone to causing the error can be avoided. Then, the prediction information used for predicting the demand intention of the user is generated based on the input text vector and the user vector. Because the user vector is obtained based on the user history information, the user vector may reflect the historical behavior of the user. Thus, the generated prediction information is more consistent with demands of the user. Therefore, the method for judging the demand intention of the user according to the user vector and the input text vector is provided, which is conducive to reducing popping of the unnecessary information. The user can be prevented from being disturbed, thereby improving the user experience.

Figure 5:
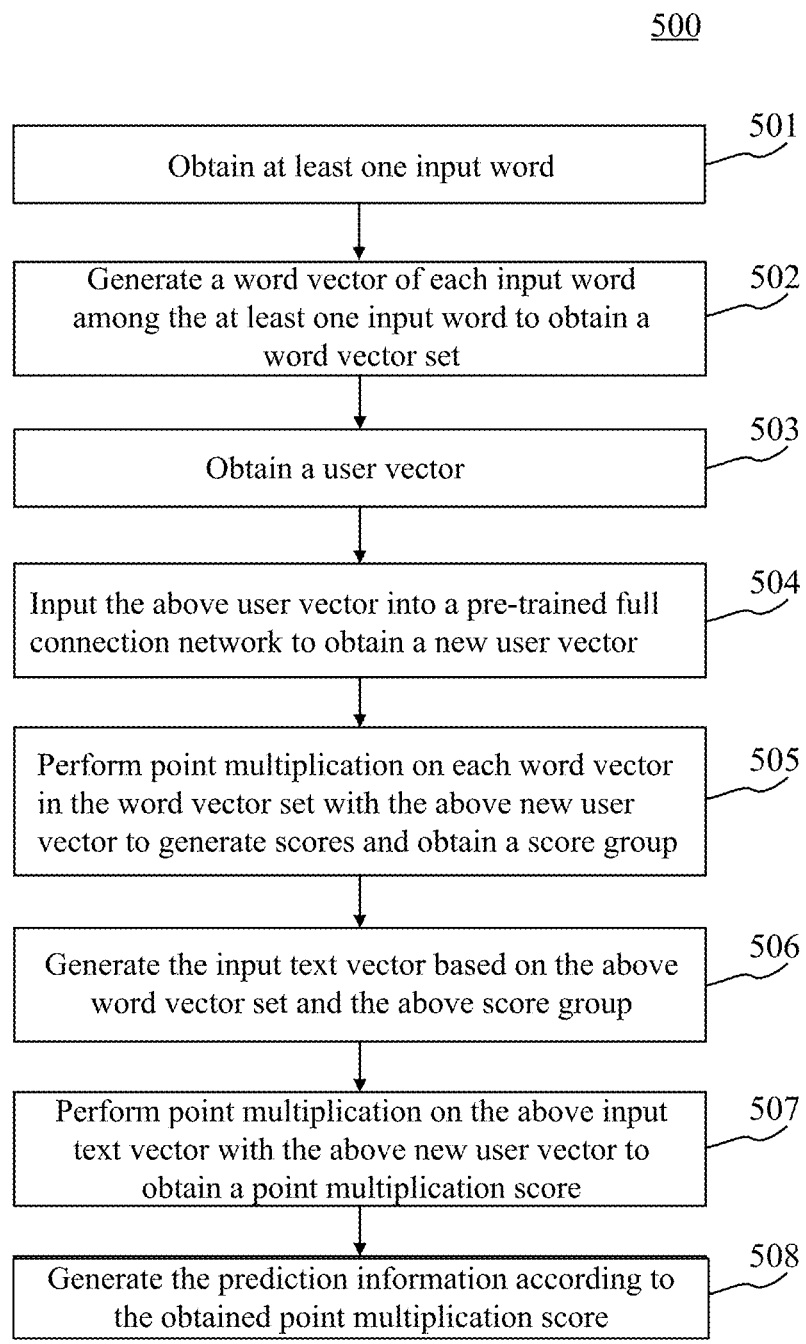
FIG. 5 is a flow chart of some other embodiments of a method for generating prediction information according to the present disclosure.

Continue to refer to FIG. 5, which shows a flow chart 500 of some other embodiments of a method for generating prediction information according to the present disclosure. The method for generating the prediction information includes the following steps:

step 501, at least one input word is obtained.

Step 502, a word vector of each input word among the at least one input word is generated to obtain a word vector set.

In some embodiments, the specific implementation of steps 501-502 and the resulting technical effects may refer to steps 201-202 in those embodiments corresponding to FIG. 2, which will not be repeated here.

Step 503, a user vector is obtained.

In some embodiments, the above executive body may obtain the user vector in a variety of ways. For example, the above executive body may obtain the user vector from a local database. For another example, the above executive body may be connected with other electronic devices through a wired connection or wireless connection mode to obtain the user vector.

Step 504, the above user vector is input into a pre-trained full connection network to obtain a new user vector.

In some embodiments, the above executive body may input the above user vector into the pre-trained full connection network to obtain the new user vector. The above pre-trained full connection network has a nonlinear ability to extract more user features.

Step 505, point multiplication is performed on each word vector in the word vector set with the above new user vector to generate scores and obtain a score group.

In some embodiments, the above executive body may perform point multiplication on each word vector in the above word vector set with the above new user vector respectively. Each obtained point multiplication result may be processed by the normalization method to obtain scores of the above each point multiplication result and combine them to obtain the score group. Here, the score may be used for representing the weight of the word vector. Here, the normalization method may be used for converting data into decimals between [0, 1].

Step 506, the input text vector is generated based on the above word vector set and the above score group.

In some embodiments, the above executive body firstly may take a score in the above score group corresponding to each word vector in the above word vector set as the weight of the word vector. Then, the above executive body may multiply each word vector in the above word vector set by the weight corresponding to the word vector to obtain a multiplication result. Then, the above executive body may add all obtained multiplication results to obtain the input text vector.

As an example, the word vector set may be "[A(1, 2, 3)], B(6, 9, 8), C(3, 4, 7)", and the score group may be "[A−0.4, B−0.8, C−0.1]". The above executive body may multiply each word vector in the above word vector set by the score (weight) corresponding to the word vector to obtain the multiplication results, which respectively are "(1, 2, 3)*0.4", "(6, 9, 8)*0.8" and "(3, 4, 7)*0.1". The above executive body may add the obtained multiplication results to obtain the input text vector "[0.4 (1, 2, 3)]+0.8 (6, 9, 8)+0.1 (3, 4, 7)".

Step 507, point multiplication is performed on the above input text vector with the above new user vector to obtain a point multiplication score.

In some embodiments, the above executive body may perform point multiplication on the above input text vector with the above new user vector to obtain a point multiplication result. Then the normalization method is used for processing the above point multiplication result to obtain the above point multiplication score.

Step 508, the prediction information used for predicting the user intention is generated according to the obtained point multiplication score.

In some embodiments, the specific implementation of step 508 and the resulting technical effects may refer to step 204 in those embodiments corresponding to FIG. 2, which will not be repeated here.

Figure 6:
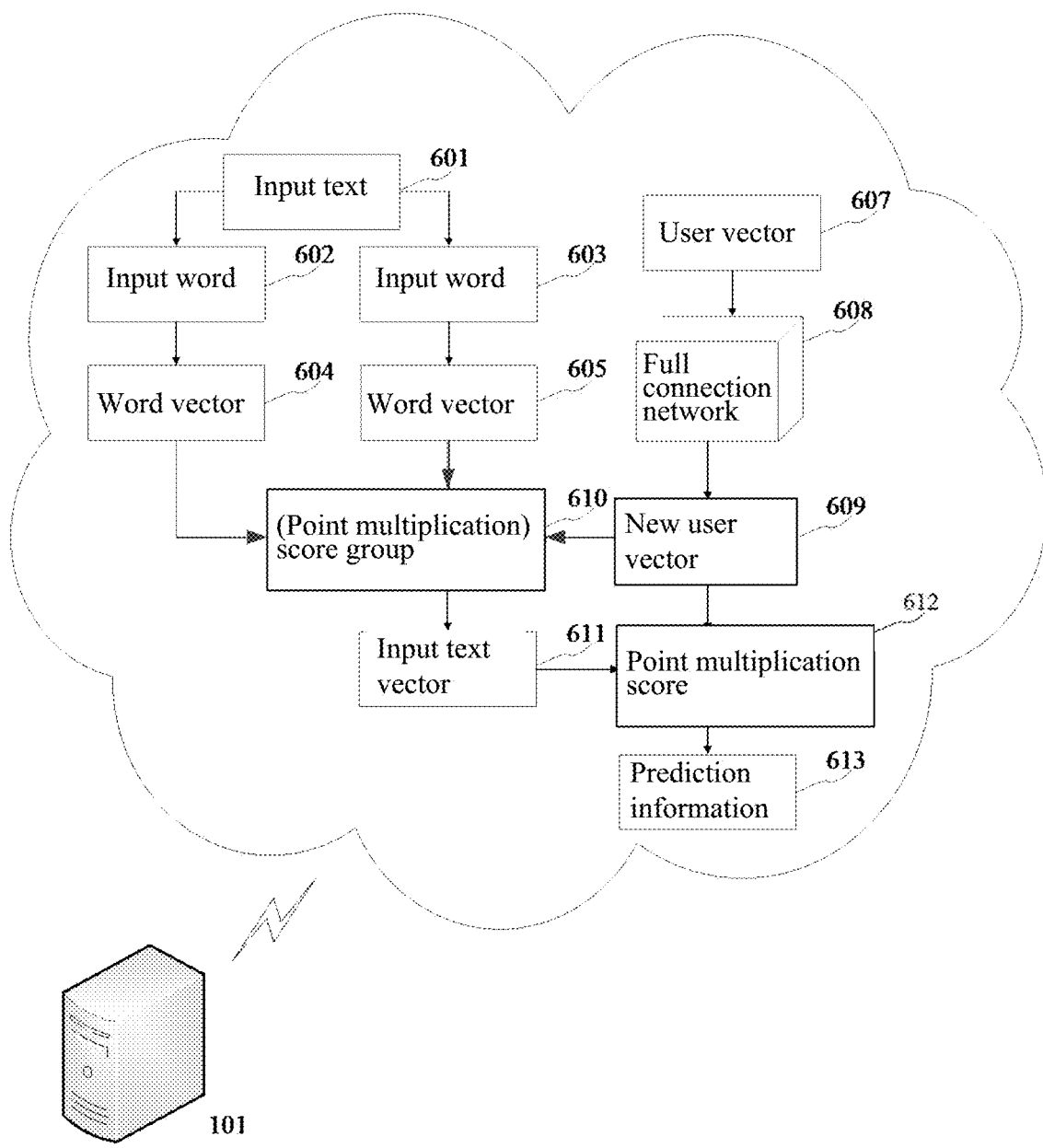
FIG. 6 is a schematic diagram of an application scene of a method for generating prediction information according to some other embodiments of the present disclosure.

As an example, in an application scene of FIG. 6, the computing device 101 may obtain an input word 602 and an input word 603. The obtained input word 602 and input word 603 may be obtained by segmenting input text 601. Of course, the input text 601 may also be segmented by other computing devices, and then the computing device directly gets a segmentation result, namely the input word 602 and the input word 603. Then, the computing device 101 may generate a word vector 604 of the input word 602 and a word vector 605 of the input word 603. As an example, the computing device 101 may obtain a user vector 607. Then, the computing device 101 may input the user vector 607 into a pre-trained full connection network 608 to obtain a new user vector 609. Then, the computing device 101 may perform point multiplication on the word vector 604 and the word vector 605 with the above new user vector 609 to generate scores and obtain a (point multiplication) score group 610. Then, the computing device 101 may generate the input text vector 611 based on the word vector 604, the word vector 605 and the above (point multiplication) score group 610. Then, the computing device 101 may perform point multiplication on the input text vector 611 with the above new user vector 609 to obtain the point multiplication score 612. Finally, the computing device 101 may generate the prediction information 613 according to the obtained point multiplication score 612.

It should be understood that the number of the computing device in FIG. 6 is only schematic. According to implementation needs, there may be any number of computing devices.

One of the above embodiments of the present disclosure has the following beneficial effects: first, the word vector of the input word is generated to obtain the word vector set. The user vector may obtain the new optimized user vector through the full connection network. Then point multiplication is performed on the new user vector with each word vector in the word vector set to obtain the score group, so as to generate the input text vector. Then point multiplication is performed on the input text vector with the new user vector to obtain the point multiplication score. The accuracy of the point multiplication score can be improved based on the double point multiplication with the new user vector. Finally, the prediction information is generated based on the point multiplication score. Therefore, the method for predicting the demand intention of the user based on the user vector and point multiplication of the user vector with the input text vector is provided, which is conducive to reducing popping of the unnecessary information. The user can be prevented from being disturbed, thereby improving the user experience.

Figure 7:
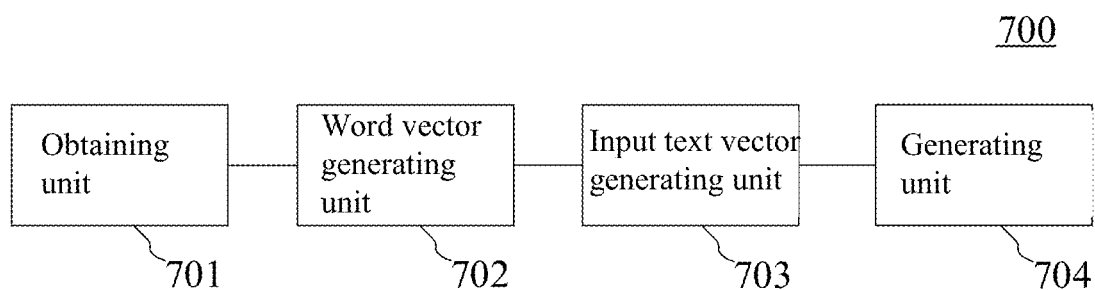
FIG. 7 is a schematic structural diagram of some embodiments of an apparatus for generating prediction information according to the present disclosure.

Continue to refer to FIG. 7, as an implementation of the above method of each above figure, the present disclosure provides some embodiments of an apparatus for generating prediction information, these apparatus embodiments correspond to those above method embodiments in FIG. 2, and the apparatus may be specifically applied to various electronic devices.

As shown in FIG. 7, an apparatus 700 for generating the prediction information in some embodiments includes: an obtaining unit 701, a word vector generating unit 702, an input text vector generating unit 703 and a generating unit 704. The obtaining unit 701 is configured to obtain at least one input word, wherein the at least one above input word is obtained by segmenting a target input text; the word vector generating unit 702 is configured to generate a word vector of each input word among the at least one input word to obtain a word vector set; the input text vector generating unit 703 is configured to generate an input text vector based on the above word vector set; and the generating unit 704 is configured to generate prediction information used for predicting a user intention based on the above input text vector and a user vector.

In some optional implementations of some embodiments, the input text vector generating unit 703 of the apparatus 700 for generating the prediction information is further configured to sum the word vectors in the above word vector set to obtain the above input text vector.

In some optional implementations of some embodiments, the input text vector generating unit 703 of the apparatus 700 for generating the prediction information is further configured to obtain the user vector; and obtain the above input text vector based on the above word vector set, the above user vector and an attention mechanism network.

In some optional implementations of some embodiments, the input text vector generating unit 703 of the apparatus 700 for generating the prediction information is further configured to input the above user vector into a pre-trained full connection network to obtain a new user vector; and input the above word vector set and the above new user vector into the above attention mechanism network to obtain the above input text vector.

In some optional implementations of some embodiments, the input text vector generating unit 703 of the apparatus 700 for generating the prediction information is further configured to perform point multiplication on each word vector in the above word vector set with the above user vector to generate scores and obtain a score group; and obtain the above input text vector based on the above word vector set and the score group.

In some optional implementations of some embodiments, the generating unit 704 of the apparatus 700 for generating the prediction information is further configured to perform point multiplication on the above input text vector with the above new user vector to obtain a point multiplication score; and generate the prediction information based on the above point multiplication score.

In some optional implementations of some embodiments, the generating unit 704 of the apparatus 700 for generating the prediction information is further configured to input the above input text vector and the above user vector into a pre-trained prediction information generating model to obtain the prediction information, wherein the prediction information generating model is obtained by training a training sample set.

In some optional implementations of some embodiments, a training sample in the above training sample set includes a sample input text vector, a sample user vector and sample prediction information, and the above prediction information generating model is obtained by training with the above sample input text vector and the above sample user vector as inputs and the above sample prediction information as an expected output.

In some optional implementations of some embodiments, the above training sample set is updated through the following steps: a user related information set is obtained, wherein user related information in the above user related information set includes the input text vector, the user vector and the prediction information, and the above prediction information is not predicted by the above prediction information generating model; data amplification is performed on the user related information set based on a preset proportion to obtain an amplified user related information set; and the above amplified user related information set is added to the training sample set to generate an updated training sample set.

In some optional implementations of some embodiments, the above user history information includes historical operation record information whether the user clicks a popped image.

In some optional implementations of some embodiments, whether to pop an image is determined according to the above prediction information used for predicting the user intention; in response to determining to pop the image, at least one image is selected from an image database as the popped image to obtain a popped image set; the popped images in the above popped image set are sorted based on the above user historical operation record information to obtain a popped image sequence; a preset number of popped images are selected from the above popped image sequence; and the above preset number of popped images are displayed on a target interface.

In some optional implementations of some embodiment, in response to determining to pop the image, selecting the at least one image from the image database as the popped image to obtain the popped image set, includes: in response to determining to pop the image, a feature vector of each image in the above image database is obtained to obtain a feature vector set; relevancy between each feature vector in the feature vector set and the input text vector is determined to obtain a relevancy set; and an image with the relevancy greater than a preset threshold is selected from the above image database as the popped image based on the above relevancy set to obtain the popped image set.

It can be understood that all the units recorded in the apparatus 700 correspond to each step in the method described with reference to FIG. 2. Therefore, operations, features and generated beneficial effects described above for the method are also applicable to the apparatus 700 and the units contained therein, and will not be repeated here.

Figure 8:
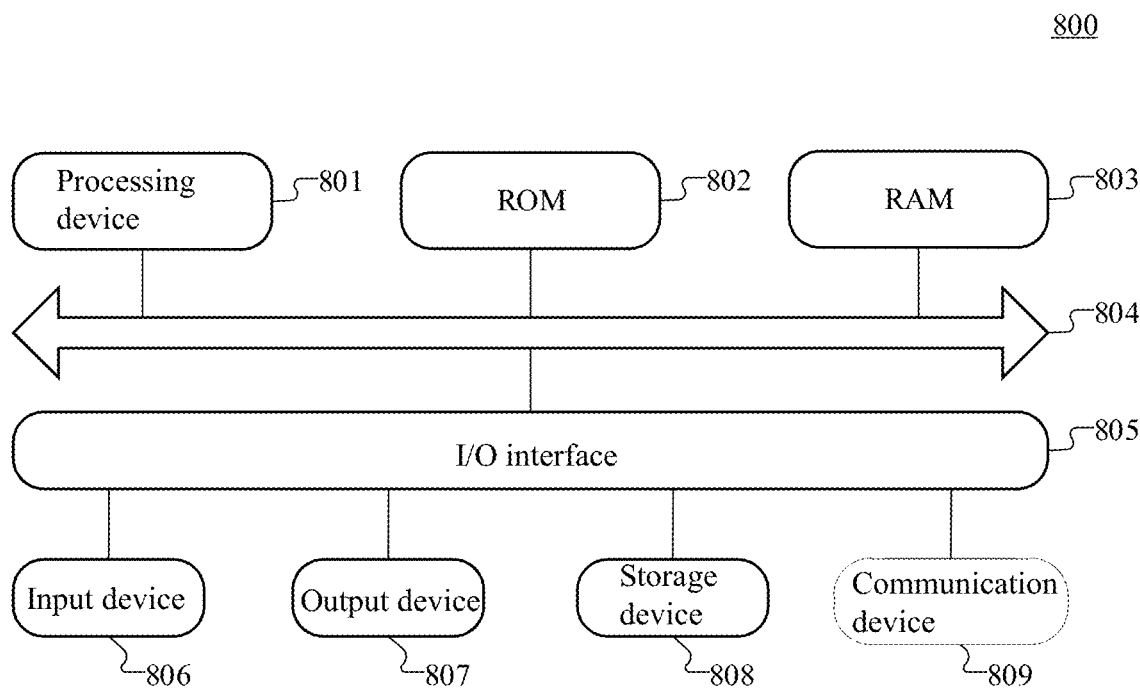
FIG. 8 is a schematic structural diagram of an electronic device suitable for implementing some embodiments of the present disclosure.

Reference is made below to FIG. 8, which illustrates a schematic diagram of the structure of an electronic device (e.g., the computing device of FIG. 1) 800 suitable for implementing some embodiments of the present disclosure. The server illustrated in FIG. 8 is merely an example and should not impose any limitations on the functionality and scope of use of embodiments of the present disclosure.

As shown in FIG. 8, the electronic device 800 may include a processing device (e.g., central processor, graphics processor, etc.) 801 that may perform various appropriate actions and processes based on a program stored in a read-only memory (ROM) 802 or loaded into a random access memory (RAM) 803 from a storage device 808. Also stored in RAM 803 are various programs and data required for the operation of electronic device 800. The processing device 801, ROM 802, and RAM 803 are connected to each other via bus 804. The input/output (I/O) interface 805 is also connected to the bus 804.

Typically, the following devices can be connected to I/O interface 805: input devices 806 including, for example, touch screens, touch pads, keyboards, mice, cameras, microphones, accelerometers, gyroscopes, etc.; output devices 807 including, for example, liquid crystal displays (LCDs), speakers, vibrators, etc.; storage devices 808 including, for example, magnetic tapes, hard drives, etc.; and communication devices 809. Communication devices 809 may allow the electronic device 800 to communicate wirelessly or wired with other devices to exchange data. While FIG. 8 illustrates electronic device 800 with various devices, it should be understood that it is not required to implement or have all of the devices illustrated. More or fewer devices may alternatively be implemented or available. Each box illustrated in FIG. 8 may represent one device, or multiple devices as desired.

In particular, according to some embodiments of the present disclosure, the process described above with reference to the flowchart may be implemented as a computer software program. For example, some embodiments of the present disclosure include a computer program product comprising a computer program carried on a computer readable medium, the computer program comprising program code for performing the method shown in the flowchart. In some such embodiments, the computer program may be downloaded and installed from a network via a communication device 809, or from a storage device 808, or from a ROM 802. When this computer program is executed by processing device 801, it performs the above-described functions as defined in the methods of some embodiments of the present disclosure.

It is to be noted that the computer readable medium described above in some embodiments of the present disclosure may be a computer readable signal medium or a computer readable storage medium or any combination of the foregoing. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above. magnetic memory devices, or any suitable combination of the foregoing. In some embodiments of the present disclosure, the computer readable storage medium may be any tangible medium that contains or stores a program that may be used by or in combination with an instruction execution system, device, or device. And in some embodiments of the present disclosure, the computer readable signaling medium may include a data signal propagated in the baseband or as part of a carrier wave that carries computer readable program code. Such propagated data signals may take a variety of forms, including but not limited to electromagnetic signals, optical signals, or any suitable combination of the foregoing. Computer-readable signal medium can also be any computer-readable medium other than computer-readable storage media, the computer-readable signal medium can send, propagate or transmit the program for use by or in combination with the instruction execution system, device or device. The program code contained on the computer-readable medium may be transmitted by any suitable medium, including but not limited to: wire, fiber optic cable, RF (radio frequency), etc., or any suitable combination of the above.

In some implementations, the client, server may communicate using any currently known or future developed network protocol such as HTTP (HyperText Transfer Protocol), and may interconnect with any form or medium of digital data communication (e.g., a communication network). Examples of communication networks include local area networks ("LANs"), wide area networks ("WANs"), inter-networks (e.g., the Internet), and end-to-end networks (e.g., ad hoc end-to-end networks), as well as any currently known or future developed networks. The above computer readable medium may be contained in the above device; or it may be separate and not assembled into the electronic device. The above computer readable medium carries one or more programs which, when the above one or more programs are executed by the electronic device, cause the electronic device to: obtain at least one input word, wherein the at least one input word is obtained by segmenting a target input text; generate a word vector of each input word among the at least one input word to obtain a word vector set; generate an input text vector based on the word vector set; generate prediction information used for predicting a user intention based on the input text vector and a user vector.

Computer program code for performing the operations of some embodiments of the present disclosure can be written in one or more programming languages or combinations thereof, including object-oriented programming languages-such as Java, Smalltalk, C++, and also conventional procedural programming languages-such as "C" or the like. such as "C" language or similar programming languages. The program code may be executed entirely on the user's computer, partially on the user's computer, as a stand-alone package, partially on the user's computer and partially on a remote computer, or entirely on a remote computer or server. In the case involving a remote computer, the remote computer may be connected to the user computer over any kind of network-including a local area network (LAN) or a wide area network (WAN)—or, alternatively, may be connected to an external computer (e.g., using an Internet service provider to connect via the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The units described in some embodiments of the present disclosure may be implemented by means of software or may be implemented by means of hardware. The units described may also be provided in a processor, for example, a processor may be described as comprising an acquisition unit, a word vector generation unit, an input text vector generation unit, and a generation unit. For example, the acquisition unit may also be described as "a unit for acquiring at least one input word".

The functions described above herein may be performed, at least in part, by one or more hardware logic components. For example, non-limitingly, exemplary types of hardware logic components that may be used include: field-programmable gate arrays (FPGAs), application-specific integrated circuits (ASICs), application-specific standard products (ASSPs), systems-on-chip (SOCs), complex programmable logic devices (CPLDs), and the like.

According to one or more embodiments of the present disclosure, provide a method for generating prediction information, comprising: obtaining at least one input word, wherein the at least one input word is obtained by segmenting a target input text; generating a word vector of each input word among the at least one input word to obtain a word vector set.

According to one or more embodiments of the present disclosure, wherein generating the input text vector based on the word vector set, comprises: summing the word vectors in the word vector set to obtain the input text vector.

According to one or more embodiments of the present disclosure, wherein generating the input text vector based on the word vector set, comprises: obtaining the user vector; and obtaining the input text vector based on the word vector set, the user vector and an attention mechanism network.

According to one or more embodiments of the present disclosure, wherein obtaining the input text vector based on the word vector set, the user vector and the attention mechanism network, comprises: inputting the user vector into a pre-trained full connection network to obtain a new user vector; and inputting the word vector set and the new user vector into the attention mechanism network to obtain the input text vector.

According to one or more embodiments of the present disclosure, wherein inputting the word vector set and the new user vector into the attention mechanism network to obtain the input text vector, comprises: performing point multiplication on each word vector in the word vector set with the new user vector to generate scores and obtain a score group; and generating the input text vector based on the word vector set and the score group.

According to one or more embodiments of the present disclosure, wherein generating the prediction information based on the input text vector and the user vector, comprises: performing point multiplication on the input text vector with the new user vector to obtain a point multiplication score; and generating the prediction information based on the point multiplication score.

According to one or more embodiments of the present disclosure, wherein generating the prediction information based on the input text vector and the user vector, comprises: inputting the input text vector and the user vector into a pre-trained prediction information generating model to obtain the prediction information, wherein the prediction information generating model is obtained by training a training sample set.

According to one or more embodiments of the present disclosure, wherein a training sample in the training sample set comprises a sample input text vector, a sample user vector and sample prediction information, and the prediction information generating model is obtained by training with the sample input text vector and the sample user vector as inputs and the sample prediction information as an expected output.

According to one or more embodiments of the present disclosure, wherein the training sample set is updated through the following steps: obtaining a user related information set, wherein user related information in the user related information set comprises the input text vector, the user vector and the prediction information, and the prediction information is not predicted by the prediction information generating model; performing data amplification on the user related information set based on a preset proportion to obtain an amplified user related information set; and adding the amplified user related information set to the training sample set to generate an updated training sample set.

According to one or more embodiments of the present disclosure, wherein the user history information comprises historical operation record information whether a user clicks a popped image.

According to one or more embodiments of the present disclosure, the method further comprising: determining whether to pop an image according to the prediction information used for predicting the user intention; selecting, in response to determining to pop the image, at least one image from an image database as the popped image to obtain a popped image set; sorting the popped images in the popped image set based on the user historical operation record information to obtain a popped image sequence; selecting a preset number of popped images from the popped image sequence; and displaying the preset number of popped images on a target interface.

According to one or more embodiments of the present disclosure, wherein selecting, in response to determining to pop the image, at least one image from the image database as the popped image to obtain the popped image set, comprises: obtaining, in response to determining to pop the image, a feature vector of each image in the image database to obtain a feature vector set; determining a relevancy between each feature vector in the feature vector set and the input text vector to obtain a relevancy set; and selecting an image with the relevancy greater than a preset threshold from the image database as the popped image based on the relevancy set to obtain the popped image set.

According to one or more embodiments of the present disclosure, provide an apparatus for generating prediction information, comprising: an obtaining unit, configured to obtain at least one input word, wherein the at least one input word is obtained by segmenting a target input text; a word vector generating unit, configured to generate a word vector of each input word among the at least one input word to obtain a word vector set; an input text vector generating unit, configured to generate an input text vector based on the word vector set; and a generating unit, configured to generate prediction information used for predicting a user intention based on the input text vector and a user vector.

According to one or more embodiments of the present disclosure, provided an electronic device, comprising: one or more processors; and a storage apparatus, storing one or more programs, wherein the one or more programs, when executed by the one or more processors, cause the one or more processors to implement the method according to any one of the above embodiments.

According to one or more embodiments of the present disclosure, provided a non-transitory computer-readable medium, storing a computer program, wherein the program, when executed by a processor, implements the method according to any one of the above embodiments.

The above description is only a description of some preferred embodiments of the present disclosure and of the technical principles applied. It should be understood by those skilled in the art that the scope of the invention covered by the embodiments of the present disclosure is not limited to technical solutions resulting from a particular combination of the above technical features, but should also cover other technical solutions resulting from any combination of the above technical features or their equivalent features without departing from the above inventive concept. For example, the above features are interchangeable with (but not limited to) technical features with similar functions disclosed in the embodiments of the present disclosure.

What is claimed is:

1. A method for generating prediction information, comprising:
    obtaining at least one input word, wherein the at least one input word is obtained by segmenting a target input text;
    generating a word vector of each input word among the at least one input word to obtain a word vector set;
    generating an input text vector based on the word vector set;
    generating prediction information used for predicting a user intention based on the input text vector and a user vector, wherein the user vector is obtained based on user history information, and wherein the user history information comprises historical operation record information indicating whether a user clicks a popped image;
    determining whether to pop an image based on the prediction information for predicting the user intention;
    selecting, in response to determining to pop the image, images from an image database to obtain a popped image set, wherein the selecting, in response to determining to pop the image, images from an image database to obtain a popped image set further comprises:
        obtaining, in response to determining to pop the image, a feature vector of each image in the image database to obtain a feature vector set,
        determining a relevancy between each feature vector in the feature vector set and the input text vector to obtain a relevancy set, and
        selecting the images with the relevancy greater than a preset threshold from the image database based on the relevancy set to obtain the popped image set;
    sorting the images in the popped image set based on the user historical operation record information to obtain a popped image sequence;
    selecting a preset number of popped images from the popped image sequence; and
    displaying the preset number of popped images on a target interface.

2. The method according to claim 1, wherein generating the input text vector based on the word vector set, comprises:
    summing the word vectors in the word vector set to obtain the input text vector.

3. The method according to claim 1, wherein generating the input text vector based on the word vector set, comprises:
    obtaining the user vector; and
    obtaining the input text vector based on the word vector set, the user vector and an attention mechanism network.

4. The method according to claim 3, wherein obtaining the input text vector based on the word vector set, the user vector and the attention mechanism network, comprises:
    inputting the user vector into a pre-trained full connection network to obtain a new user vector; and
    inputting the word vector set and the new user vector into the attention mechanism network to obtain the input text vector.

5. The method according to claim 4, wherein inputting the word vector set and the new user vector into the attention mechanism network to obtain the input text vector, comprises:
    performing point multiplication on each word vector in the word vector set with the new user vector to generate scores and obtain a score group; and
    generating the input text vector based on the word vector set and the score group.

6. The method according to claim 5, wherein generating the prediction information based on the input text vector and the user vector, comprises:
    performing point multiplication on the input text vector with the new user vector to obtain a point multiplication score; and
    generating the prediction information based on the point multiplication score.

7. The method according to claim 1, wherein generating the prediction information based on the input text vector and the user vector, comprises:
    inputting the input text vector and the user vector into a pre-trained prediction information generating model to obtain the prediction information, wherein the prediction information generating model is obtained by training a training sample set.

8. The method according to claim 7, wherein a training sample in the training sample set comprises a sample input text vector, a sample user vector and sample prediction information, and the prediction information generating model is obtained by training with the sample input text vector and the sample user vector as inputs and the sample prediction information as an expected output.

9. The method according to claim 8, wherein the training sample set is updated through the following steps:
    obtaining a user related information set, wherein user related information in the user related information set comprises the input text vector, the user vector and the prediction information, and the prediction information is not predicted by the prediction information generating model;
    performing data amplification on the user related information set based on a preset proportion to obtain an amplified user related information set; and
    adding the amplified user related information set to the training sample set to generate an updated training sample set.

10. An electronic device, comprising:
    one or more processors; and
    a storage apparatus, storing one or more programs, wherein the one or more programs, when executed by the one or more processors, cause the one or more processors to implement operations comprising:
        obtaining at least one input word, wherein the at least one input word is obtained by segmenting a target input text;
        generating a word vector of each input word among the at least one input word to obtain a word vector set;
        generating an input text vector based on the word vector set;

generating prediction information used for predicting a user intention based on the input text vector and a user vector, wherein the user vector is obtained based on user history information, and wherein the user history information comprises historical operation record information indicating whether a user clicks a popped image;

determining whether to pop an image based on the prediction information for predicting the user intention;

selecting, in response to determining to pop the image, images from an image database to obtain a popped image set, wherein the selecting, in response to determining to pop the image, images from an image database to obtain a popped image set further comprises:

obtaining, in response to determining to pop the image, a feature vector of each image in the image database to obtain a feature vector set, determining a relevancy between each feature vector in the feature vector set and the input text vector to obtain a relevancy set, and selecting the images with the relevancy greater than a preset threshold from the image database based on the relevancy set to obtain the popped image set;

sorting the images in the popped image set based on the user historical operation record information to obtain a popped image sequence;

selecting a preset number of popped images from the popped image sequence; and displaying the preset number of popped images on a target interface.

11. The electronic device according to claim 10, wherein generating the input text vector based on the word vector set, comprises:

summing the word vectors in the word vector set to obtain the input text vector.

12. The electronic device according to claim 10, wherein generating the input text vector based on the word vector set, comprises:

obtaining the user vector; and obtaining the input text vector based on the word vector set, the user vector and an attention mechanism network.

13. The electronic device according to claim 12, wherein obtaining the input text vector based on the word vector set, the user vector and the attention mechanism network, comprises:

inputting the user vector into a pre-trained full connection network to obtain a new user vector; and inputting the word vector set and the new user vector into the attention mechanism network to obtain the input text vector.

14. The electronic device according to claim 13, wherein inputting the word vector set and the new user vector into the attention mechanism network to obtain the input text vector, comprises:

performing point multiplication on each word vector in the word vector set with the new user vector to generate scores and obtain a score group; and generating the input text vector based on the word vector set and the score group.

15. The electronic device according to claim 14, wherein generating the prediction information based on the input text vector and the user vector, comprises:

performing point multiplication on the input text vector with the new user vector to obtain a point multiplication score; and generating the prediction information based on the point multiplication score.

16. The electronic device according to claim 10, wherein generating the prediction information based on the input text vector and the user vector, comprises:

inputting the input text vector and the user vector into a pre-trained prediction information generating model to obtain the prediction information, wherein the prediction information generating model is obtained by training a training sample set.

17. A non-transitory computer-readable medium, storing a computer program, wherein the program, when executed by a processor, causes the processor to implements operations comprising:

obtaining at least one input word, wherein the at least one input word is obtained by segmenting a target input text;

generating a word vector of each input word among the at least one input word to obtain a word vector set;

generating an input text vector based on the word vector set;

generating prediction information used for predicting a user intention based on the input text vector and a user vector, wherein the user vector is obtained based on user history information, and wherein the user history information comprises historical operation record information indicating whether a user clicks a popped image;

determining whether to pop an image based on the prediction information for predicting the user intention;

selecting, in response to determining to pop the image, images from an image database to obtain a popped image set, wherein the selecting, in response to determining to pop the image, images from an image database to obtain a popped image set further comprises:

obtaining, in response to determining to pop the image, a feature vector of each image in the image database to obtain a feature vector set, determining a relevancy between each feature vector in the feature vector set and the input text vector to obtain a relevancy set, and selecting the images with the relevancy greater than a preset threshold from the image database based on the relevancy set to obtain the popped image set;

sorting the images in the popped image set based on the user historical operation record information to obtain a popped image sequence;

selecting a preset number of popped images from the popped image sequence; and displaying the preset number of popped images on a target interface.

* * * * *